Nov. 17, 1964 W. DOBLE 3,157,404
SHAFT SEAL WITH CORRUGATED FRUSTO-CONICAL SPRING
FOR DRIVING OR RESTRAINING SEALING MEMBER
Filed March 19, 1962 3 Sheets-Sheet 1

INVENTOR
WARREN DOBLE
BY HIS ATTORNEYS
HARRIS, KIECH, RUSSELL & KERN

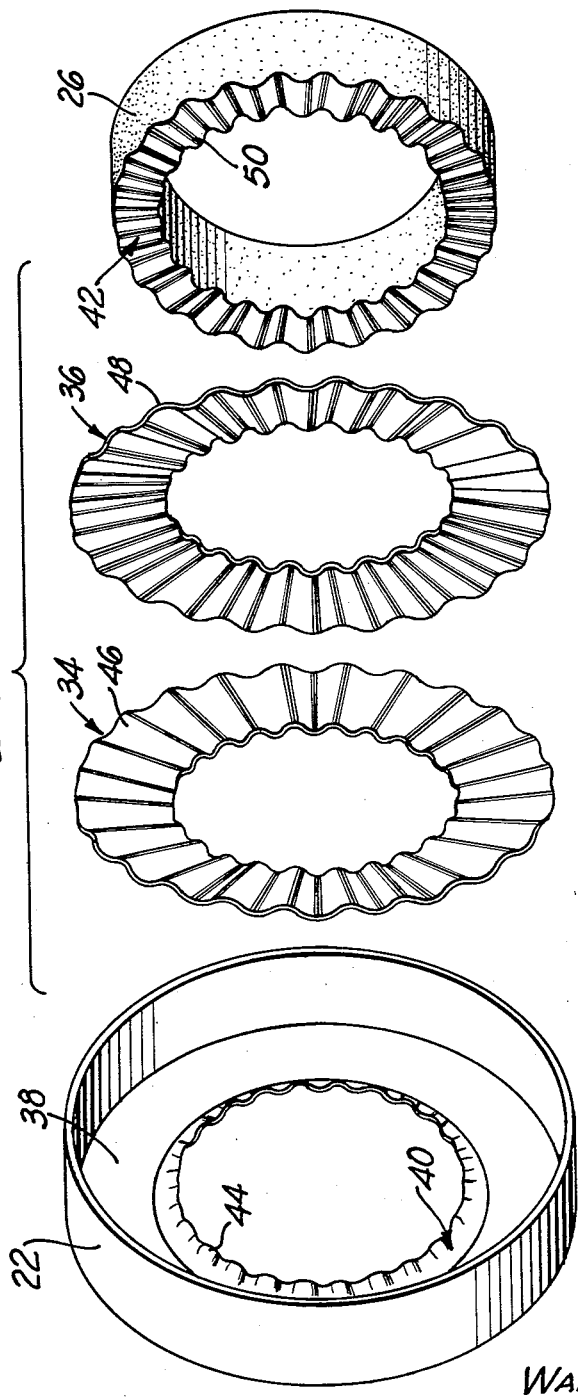

Nov. 17, 1964　　　　　W. DOBLE　　　　3,157,404
SHAFT SEAL WITH CORRUGATED FRUSTO-CONICAL SPRING
FOR DRIVING OR RESTRAINING SEALING MEMBER
Filed March 19, 1962　　　　　　　　　　3 Sheets-Sheet 3
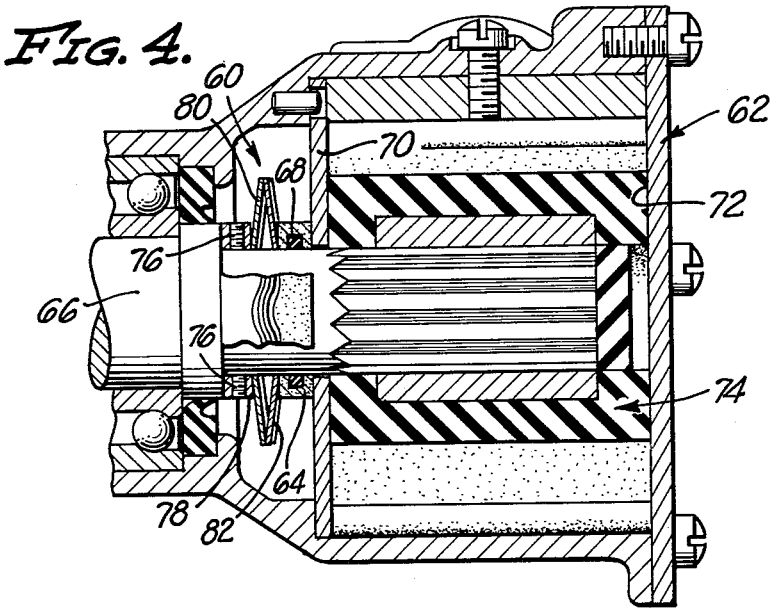
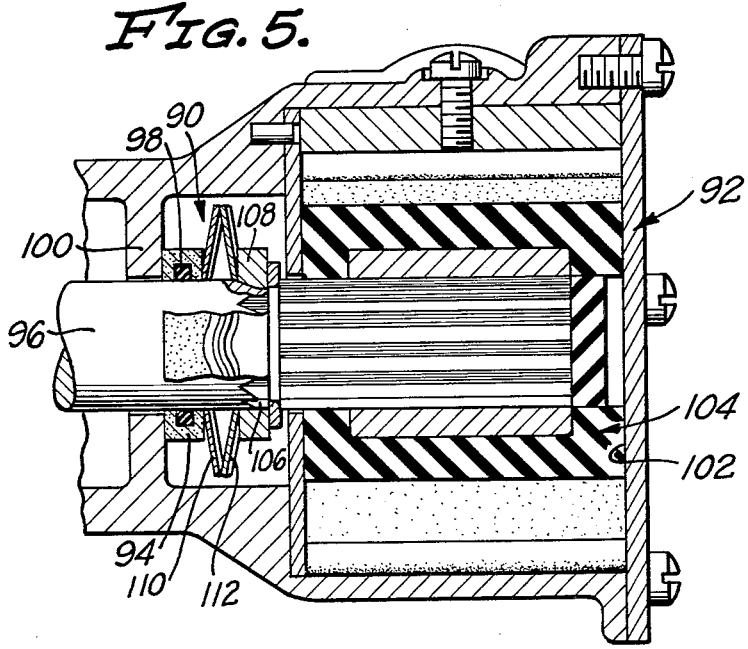
INVENTOR
WARREN DOBLE
BY HIS ATTORNEYS
HARRIS, KIECH, RUSSELL & KERN United States Patent Office 3,157,404
Patented Nov. 17, 1964

3,157,404
SHAFT SEAL WITH CORRUGATED FRUSTO-
CONICAL SPRING FOR DRIVING OR RE-
STRAINING SEALING MEMBER
Warren Doble, North Hollywood, Calif., assignor to
Jabsco Pump Company, Costa Mesa, Calif., a corporation of California
Filed Mar. 19, 1962, Ser. No. 180,548
5 Claims. (Cl. 277—93)

The present invention relates in general to shaft seals and, more particularly, to an improved shaft seal of the type utilizing rotary and nonrotary annular sealing members in face to face engagement.

General objects of the invention are to provide: a very simple, yet positively acting and completely reliable, shaft seal which may be manufactured extremely economically through the use of simple components some of which are standard, readily available parts and others of which are inexpensively producible, stamped parts; to provide a shaft seal which utilizes replaceable sealing members; to provide interengageable sealing faces of minimum diameter to insure low relative velocities therebetween; and the like.

A more specific object of the invention is to provide spring means, acting axially on one of the sealing members, and biasing such sealing member into face to face engagement with the other sealing member, having a load-deflection curve which includes a range wherein deflection is substantially independent of load so that relatively large deflections of the spring means can occur in this range with relatively small changes in load.

With the foregoing construction, if minor misalignments of the sealing members occur, the axially-biased sealing member can deflect correspondingly, to maintain the sealing members in face to face engagement, with very little change in the axial load between the sealing faces. Consequently, the axial load between the sealing faces is substantially constant despite minor misalignments, which is an important feature of the invention.

Another object is to provide a shaft seal of the foregoing nature wherein the spring means includes at least one, and preferably two or more, Belleville springs, each such spring having the desired load-deflection curve, including the aforementioned range wherein deflection is substantially independent of load.

An important object of the invention is to provide a shaft seal of the character set forth wherein a rotary or nonrotary spring seat, the Belleville springs, and a rotary or nonrotary, axially-biased sealing member, are provided with meshed, interlocked, circumferentially spaced, radial corrugations which positively key the axially-biased sealing member to the spring seat through the Belleville springs, while still permitting the Belleville springs to perform their intended function.

A further object in connection with the foregoing is to provide corrugations on the spring seat, the Belleville springs and the axially-biased sealing member, having a relatively fine circumferential pitch. The invention thus achieves an interlocking effect akin to that achieved in a stack of poker chips, for example.

Another object of the invention is to provide a shaft seal of the foregoing nature wherein two Belleville springs are placed between the spring seat and the axially-biased sealing member in face-to-face relation, but are oppositely oriented, with reference to their respective conicities, in such a manner that they are in meshed, interlocked, engagement at their outer peripheries and may be spaced apart slightly in the axial direction at their inner peripheries, the respective Belleville springs being in meshed, interlocked engagement with the spring seat and the axially-biased sealing member adjacent their inner peripheries.

A further object of the invention is to provide a shaft seal wherein the axially-biased sealing member is sealed relative to a seal housing, or a shaft, by a simple standard sealing element, such as an O-ring.

The foregoing objects, advantages, features and results of the present invention, together with various other objects, advantages, features and results thereof which will be evident to those skilled in the shaft seal art in the light of this disclosure, may be achieved with the exemplary embodiments of the invention described in detail hereinafter and illustrated in the accompanying drawings, wherein:

FIG. 2 is an exploded perspective view of the components of the shaft seal of the invention which are meshed or interlocked by means of cricumferentially spaced, radial corrugations in operation;

FIG. 4 is a view, partially in longitudinal section and partially in side elevation, illustrating a pump incorporating another shaft seal which embodies the invention; and FIG. 5 is a view, partially in longitudinal section and partially in side elevation, illustrating a pump incorporating still another shaft seal which embodies the invention.

Figure 1:
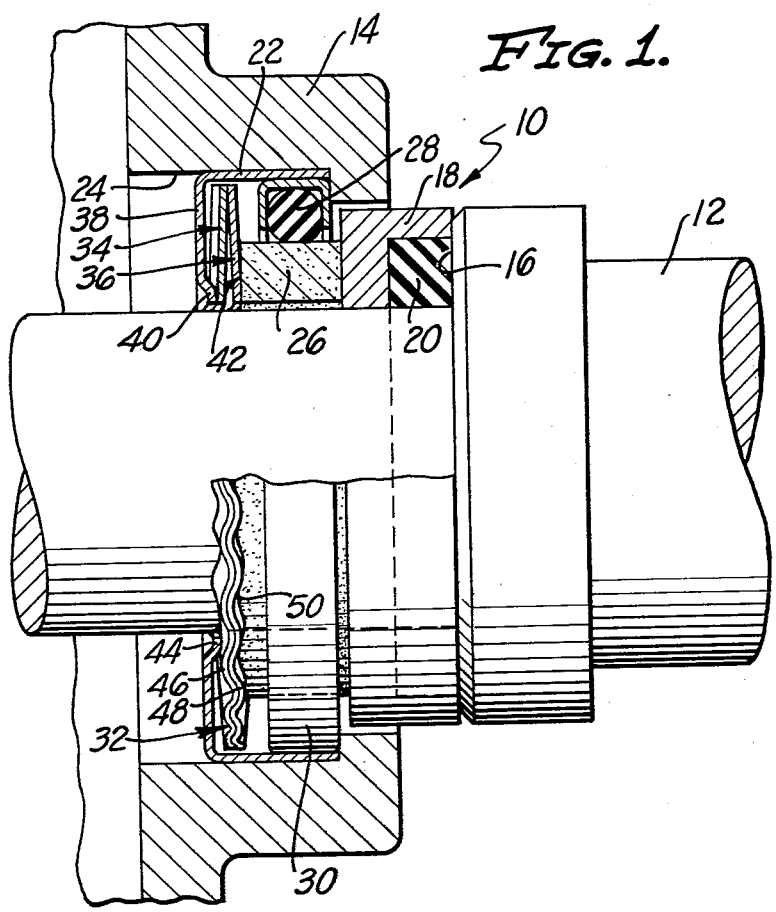
FIG. 1 is a view, partially in longitudinal section and partially in side elevation, illustrating a shaft seal which embodies the invention.

Referring initially to FIGS. 1 and 2 of the drawings, the shaft seal of the invention illustrated therein is designated generally by the numeral 10 and is shown in use to seal a shaft 12 relative to a housing 14 through which the shaft projects.

The shaft 12 is provided with an annular shoulder 16 against which is seated a rotary annular sealing member, or annular seal seat 18. The latter is suitably secured to the shaft 12 for rotation therewith, as by pressing it thereon.

A fluid tight seal between the seal seat 18 and the shaft 12 is provided by an elastomeric annular sealing element 20 engaging the periphery of the shaft 12, the annular shoulder 16 thereon, and two right-angularly-related annular surfaces on the seal seat, such surfaces being provided by making the seal seat L-shaped in cross section.

The shaft seal 10 includes a cup-shaped, annular seal housing 22, preferably inexpensively stamped from sheet metal, which is pressed into a counterbore 24 in the housing 14. Within the seal housing 22 is a nonrotary annular sealing member, preferably a carbon ring 26, which is engageable with the seal seat 18 in face to face relation. It will be noted that the sealing faces of the seal seat 18 and the carbon ring 26 are only slightly larger in diameter than the shaft 12, thereby maintaining the relative velocities of the sealing faces as low as possible.

The carbon ring 26 is sealed in a fluid tight manner relative to the seal housing 22 by an elastomeric annular sealing element, preferably an O-ring 28, encircling and engaging the carbon ring 26. The O-ring 28 is disposed in and engages an annular retainer 30 which is channel-shaped in cross section, with the open side of the channel facing radially inwardly, and which is pressed into the open end of the cup-shaped seal housing 22. The O-ring 28, of course, is an inexpensive, readily available, standard part, and the retainer 30 therefor is preferably inexpensively stamped from sheet metal.

The carbon ring 26 is resiliently biased axially into face to face engagement with the seal seat 18 by a spring means 32 shown as comprising two Belleville springs 34 and 36 interposed between an end wall 38 of the cup-shaped seal housing 22 and the adjacent end face of the carbon ring. The Belleville springs 34 and 36 are arranged in face-to-face relation and are oppositely oriented, with reference to their respective conicities, so that they are interengaged adjacent their outer peripheries, being slightly axially separated adjacent their inner peripheries. The inner peripheral portion of the Belleville spring 34 engages an annular spring seat 40 formed by an axially-inwardly-struck annular flange at the inner periphery of the end wall 38 of the cup-shaped housing 22. The Belleville spring 36 engages the adjacent end face 42 of the carbon ring 26.

As best shown in FIG. 2 of the drawings, the annular spring seat 40, the Belleville spring 34, the Belleville spring 36 and the end face 42 of the carbon ring 26 are respectively provided with circumferentially spaced, radial corrugations 44, 46, 48 and 50 of a relatively fine circumferential pitch, although such pitch can be varied.

The corrugations 44 are meshed or interlocked with the radially inner ends of the corrugations 46. The radially outer ends of the corrugations 46 are meshed or interlocked with the radially outer ends of the corrugations 48. The radially inner ends of the corrugations 48 are meshed or interlocked with the corrugations 50. This construction provides a positive keyed connection between the spring seat 40 and the carbon ring 26 through the two Belleville springs 34 and 36, while still permitting the two Belleville springs to function properly, which is an important feature of the invention.

Figure 3:
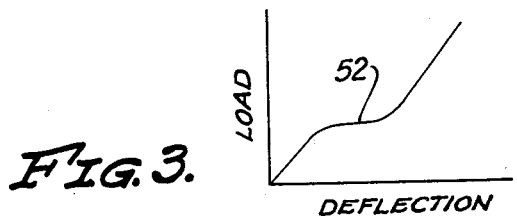
FIG. 3 is a graph showing a typical load-deflection curve of a Belleville spring incorporated in the shaft seal of the invention.

Another important feature, arising from the use of the Belleville springs 34 and 36, is that the load-deflection curve of the spring means 32, as shown in FIG. 3 of the drawings, includes a range 52 wherein the deflection of the spring means is substantially independent of the axial load applied thereto so that relatively large deflections can occur in such range with relatively small changes in the axial load. When the spring means 32 is pre-loaded to operate within the range 52, minor axial movements of the seal seat 18 produce no significant change in the axial force acting to maintain the carbon ring 26 in face to face engagement with the seal seat. Also, if there is any minor misalignment of the seal seat 18, the carbon ring 26 can misalign itself correspondingly with no significant change in the axial load on the sealing faces. Thus, the operating characteristics of the shaft seal 10 are substantially unchanged by axial shaft movements, manufacturing inaccuracies, and the like, which is an important feature.

Another advantage of the Belleville springs 34 and 36 is that they also may be inexpensively stamped from spring sheet metal to assist in minimizing the cost of manufacturing the shaft seal 10.

In the shaft seal 10 hereinbefore described, the axially-biased sealing member 26 is nonrotary. All of the hereinbefore discussed advantages of the present invention can be achieved with shaft seals wherein the axially-biased sealing member is rotary, i.e., rotates with the sealed shaft. Such shaft seals are designated by the numerals 60 and 90, respectively, in FIGS. 4 and 5, respectively, of the drawings, being illustrated therein as incorporated in pumps 62 and 92, respectively. However, it will be understood that the shaft seals 60 and 90 may be used in other environments.

Considering the shaft seal 60, it includes a rotary annular sealing member 64 encircling a shaft 66 and sealed with respect thereto by a conventional O-ring 68, or the like, disposed in an internal annular groove in this sealing member. The sealing member 64 is engageable in face to face relation with a seal seat 70 which, in this instance, comprises an end wall of an impeller chamber 72 of the pump 62. Secured to the shaft 66 within the impeller chamber 72 is an impeller 74.

Encircling the shaft 66 and secured thereto by set screws 76 is a spring seat 78 in the form of a collar spaced axially from the sealing member 64. Interposed between the sealing member 64 and the spring seat 78 are Belleville springs 80 and 82. The springs 80 and 82 have the same relations to the spring seat 78 and the sealing member 64, respectively, and to each other, as hereinbefore described in connection with the shaft seal 10. Consequently, a further description is unnecessary.

It will be noted that, in the shaft seal 10, the Belleville springs maintain the axially-biased sealing member stationary. In the shaft seal 60 (and in the shaft seal 90 to be described), the Belleville springs drive the axially-biased sealing member. In all other respects, the operating characteristics of the shaft seal 60 (and of the shaft seal 90 to be described) are identical to those of the shaft seal 10.

Considering the shaft seal 90, it includes a rotary annular sealing member 94 encircling a shaft of the pump 92 and sealed with respect thereto by an O-ring 98. The sealing member 94 is engageable in face to face relation with a seal seat 100 formed by a wall of the housing of the pump 92. In this case, the seal seat 100 is spaced from an impeller chamber 102 of the pump 92, this impeller chamber containing an impeller 104 mounted on the shaft 96.

Axially spaced from the sealing member 94 and keyed to the shaft by splines 106 is a spring seat 108. Interposed between the sealing member 94 and the spring seat 108 are Belleville springs 110 and 112. Again, the Belleville springs 110 and 112 have the same relations to the sealing member 94 and the spring seat 108, respectively, and to each other, as hereinbefore discussed in connection with the shaft seal 10. Consequently, no additional description is required.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:
1. In a shaft seal, the combination of:
   (a) rotary and nonrotary sealing members engageable in face to face relation;
   (b) an annular spring seat spaced axially from one of said sealing members;
   (c) annular spring means between and engaging said spring seat and said one sealing member for maintaining said sealing members in said face to face engagement;
   (d) said spring seat, said spring means and said one sealing member being provided with meshed, circumferentially spaced, radial corrugations which key said one sealing member to said spring seat through said spring means; and
   (e) said spring means comprising two Belleville springs arranged in face to face relation and having meshed, circumferentially, spaced radial corrugations, the corrugations of one of said Belleville springs being meshed with the corrugations of said spring seat and the corrugations of the other of said Belleville springs being meshed with the corrugations of said one sealing member.

2. In a shaft seal, the combination of:
   (a) rotary and nonrotary sealing members engageable in face to face relation;
   (b) an annular spring seat spaced axially from one of said sealing members;
   (c) annular spring means between and engaging said spring seat and said one sealing member for maintaining said sealing members in said face to face engagement;
   (d) said spring seat, said spring means and said one sealing member being provided with meshed, circumferentially spaced, radial corrugations which key said one sealing member to said spring seat through said spring means;

(e) said spring means comprising two Belleville springs arranged in face to face relation and having meshed, circumferentially, spaced radial corrugations, the corrugations of one of said Belleville springs being meshed with the corrugations of said spring seat and the corrugations of the other of said Belleville springs being meshed with the corrugations of said one sealing member; and (f) the corrugations of said Belleville springs being intermeshed adjacent the outer peripheries of said Belleville springs, and the corrugations of said Belleville springs being meshed with the corrugations of said spring seat and said one sealing member, respectively, adjacent the inner peripheries of said Belleville springs.

3. In a shaft seal, the combination of:

(a) rotary and nonrotary sealing members engageable in face to face relation;

(b) an annular spring seat spaced axially from one of said sealing members;

(c) annular spring means between and engaging said spring seat and said one sealing member for maintaining said sealing members in said face to face engagement;

(d) said spring seat, said spring means and said one sealing member being provided with meshed, circumferentially spaced, radial corrugations which key said one sealing member to said spring seat through said spring means;

(e) said spring means comprising two Belleville springs arranged in face to face relation and having meshed, circumferentially, spaced radial corrugations, the corrugations of one of said Belleville springs being meshed with the corrugations of said spring seat and the corrugations of the other of said Belleville springs being meshed with the corrugations of said one sealing member;

(f) the corrugations of said Belleville springs being intermeshed adjacent the outer peripheries of said Belleville springs, and the corrugations of said Belleville springs being meshed with the corrugations of said spring seat and said one sealing member, respectively, adjacent the inner peripheries of said Belleville springs; and (g) said Belleville springs being axially separated adjacent their inner peripheries.

4. In a shaft seal, the combination of:

(a) rotary and nonrotary sealing members engageable in face to face relation;

(b) an annular spring seat spaced axially from one of said sealing members;

(c) annular spring means between and engaging said spring seat and said one sealing member for biasing said one sealing member into face to face engagement with the other of said sealing members with a force which is substantially constant throughout a predetermined range of deflection of said spring means; and (d) said spring seat, said spring means and said one sealing member being provided with meshed, circumferentially spaced, radial corrugations which key said one sealing member to said spring seat through said spring means.

5. In a shaft seal, the combination of:

(a) rotary and nonrotary sealing members engageable in face to face relation;

(b) an annular spring seat spaced axially from one of said sealing members;

(c) frusto conical, annular spring means between and engaging said spring seat and said one sealing member for biasing said one sealing member into face to face engagement with the other of said sealing members with a force which is substantially constant throughout a predetermined range of deflection of said spring means; and (d) said spring seat, said spring means and said one sealing member being provided with meshed, circumferentially spaced, radial corrugations which key said one sealing member to said spring seat through said spring means.

References Cited in the file of this patent

UNITED STATES PATENTS

| 2,393,944 | Walley | Jan. 29, 1946 |
| 2,432,576 | Koffer | Dec. 16, 1947 |
| 2,575,549 | Doble | Nov. 20, 1951 |

FOREIGN PATENTS

| 826,099 | France | Dec. 27, 1937 |